(12) United States Patent
Gandhi et al.

(10) Patent No.: US 11,481,238 B2
(45) Date of Patent: Oct. 25, 2022

(54) METHODS AND SYSTEMS OF AUTOMATIC ONE CLICK VIRTUAL BUTTON WITH AI ASSIST FOR DIY ANIMATION

(71) Applicants: Vineet Gandhi, Hyderabad (IN); Srinivasa Raghavan Rajendran, Chennai (IN)

(72) Inventors: Vineet Gandhi, Hyderabad (IN); Srinivasa Raghavan Rajendran, Chennai (IN)

( * ) Notice: Subject to any disclaimer, the term of this patent is extended or adjusted under 35 U.S.C. 154(b) by 563 days.

(21) Appl. No.: 16/534,332

(22) Filed: Aug. 7, 2019

(65) Prior Publication Data

US 2021/0042135 A1 Feb. 11, 2021

(51) Int. Cl.
*G06F 3/0482* (2013.01)
*G06F 9/451* (2018.01)
*G06N 5/02* (2006.01)
*G06F 3/04842* (2022.01)

(52) U.S. Cl.
CPC ............ *G06F 9/453* (2018.02); *G06F 3/0482* (2013.01); *G06F 3/04842* (2013.01); *G06N 5/02* (2013.01)

(58) Field of Classification Search
CPC .......... G06F 9/453; G06F 3/0482; G06N 5/02
See application file for complete search history.

(56) References Cited

U.S. PATENT DOCUMENTS

| | | | |
|---|---|---|---|
| 9,106,812 B1* | 8/2015 | Price | H04N 21/47205 |
| 2005/0225552 A1* | 10/2005 | Anand | G06T 13/00 345/473 |
| 2012/0196260 A1* | 8/2012 | Nhiayi | G09B 5/06 434/317 |
| 2012/0311448 A1* | 12/2012 | Achour | G06Q 10/101 715/723 |
| 2013/0110671 A1* | 5/2013 | Gray | G06Q 30/06 705/26.8 |
| 2013/0135315 A1* | 5/2013 | Bares | G11B 27/031 345/473 |
| 2016/0365114 A1* | 12/2016 | Galant | G06V 20/46 |
| 2018/0143741 A1* | 5/2018 | Uriostegui | G06F 16/48 |
| 2019/0304157 A1* | 10/2019 | Amer | G06V 20/41 |

* cited by examiner

*Primary Examiner* — Phenuel S Salomon

(57) ABSTRACT

In one aspect, a computerized method of automatically generating video content using a one click artificial-intelligence assistant for generating an animation video includes the step of providing a do-it-yourself (DIY) computer animation generation system. The DIY computer animation generation system includes an animation generation dashboard. The method includes the step of providing a one click AI assistant for generating an animation video in the DIY computer animation generation system. The method includes the step of providing a one click virtual button that is displayed in the animation generation dashboard. The one click AI assistant automatically suggests a set of animation choices to a user on a single button press of the one click virtual button.

9 Claims, 16 Drawing Sheets

METHODS AND SYSTEMS OF AUTOMATIC ONE CLICK VIRTUAL BUTTON WITH AI ASSIST FOR DIY ANIMATION

BACKGROUND

Field of the Invention

The invention is in the field of computer animation and more specifically to a method, system and apparatus for automatic one click virtual button with AI assist for DIY animation.

Description of the Related Art

Creating professional looking animation videos from scratch is an extremely challenging task. Do it yourself (DIY) animation paradigm simplifies the process by maintaining a predefined set of animated background, characters, objects, actions, motion sequences etc. This reduces the effort of drawing and coloring from scratch to just selecting the right set of items and arrange them on a proper background. Current DIY animation systems have made it possible for naive users to create animation videos. Current DIY animation systems include several difficult choices such as, for example, choice of background to use, choice of color scheme to use, what should be the layout of multiple objects/characters in the scene, how to make things move (what trajectory they should take) etc. Without a lot of practice and training, such choices may be difficult for users to make. For this reason, DIY animation still remains in its infancy. Accordingly, there is a need to improve the automation of the computer animation creation in an automatic process.

BRIEF SUMMARY OF THE INVENTION

In one aspect, a computerized method of automatically generating video content using a one click artificial-intelligence assistant for generating an animation video includes the step of providing a do-it-yourself (DIY) computer animation generation system. The DIY computer animation generation system includes an animation generation dashboard. The method includes the step of providing a one click AI assistant for generating an animation video in the DIY computer animation generation system. The method includes the step of providing a one click virtual button that is displayed in the animation generation dashboard. The one click AI assistant automatically suggests a set of animation choices to a user on a single button press of the one click virtual button.

Figure 5:
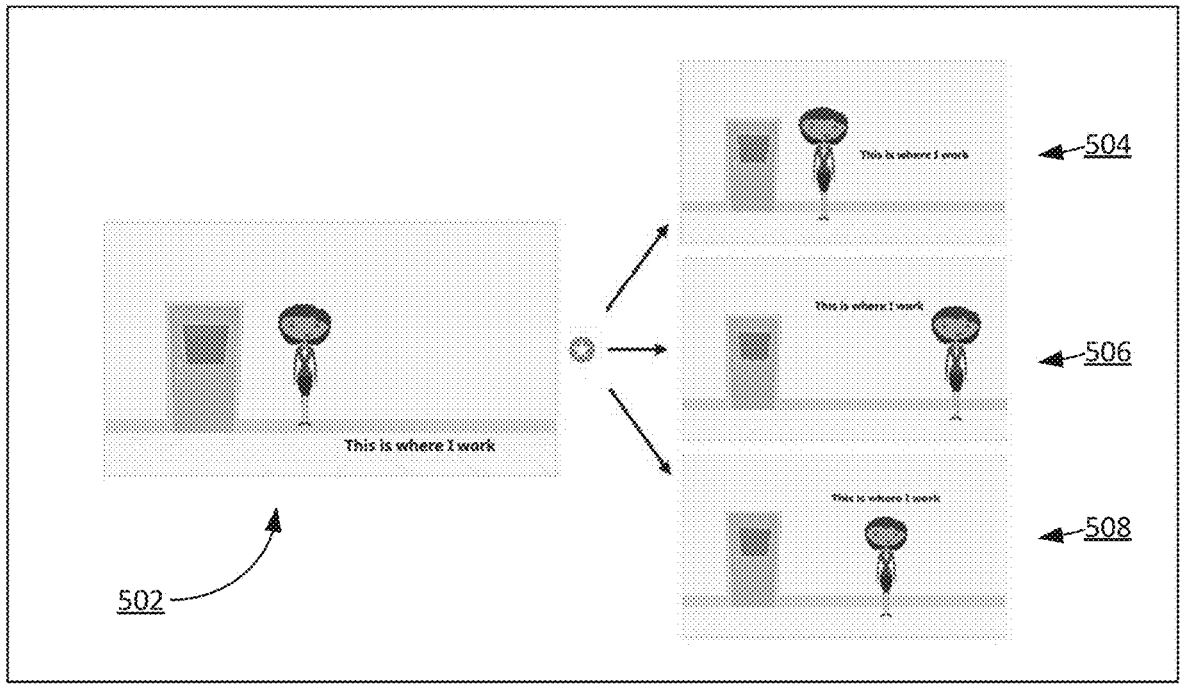

An example of a one click virtual button with AI assist for DIY animation is provided in FIG. 5, according to some embodiments.

Figure 6:
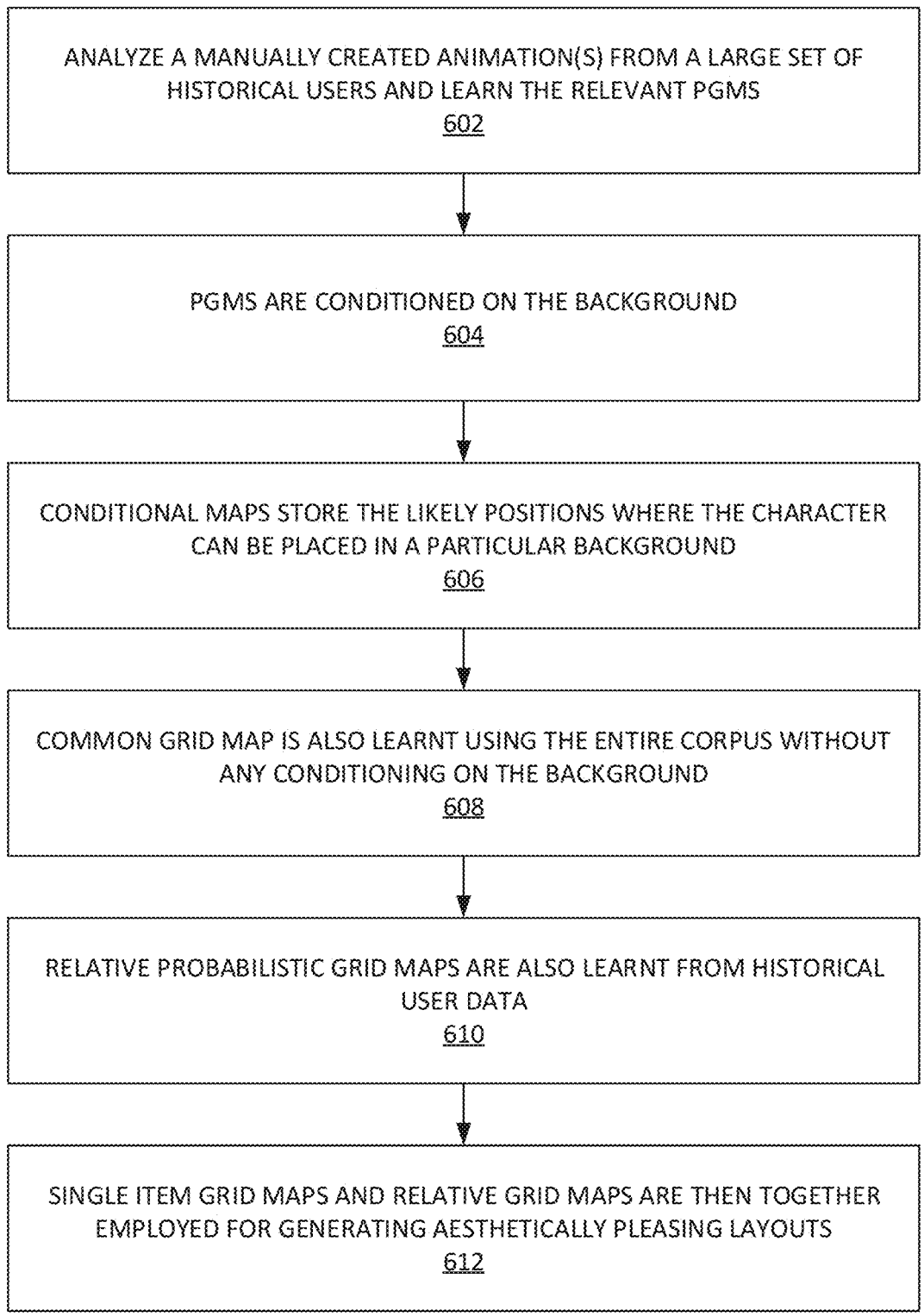

FIG. 6 illustrates a layout suggestion process according to some embodiments. Process 600 can be implemented by a layout suggestion system.

Figure 7:
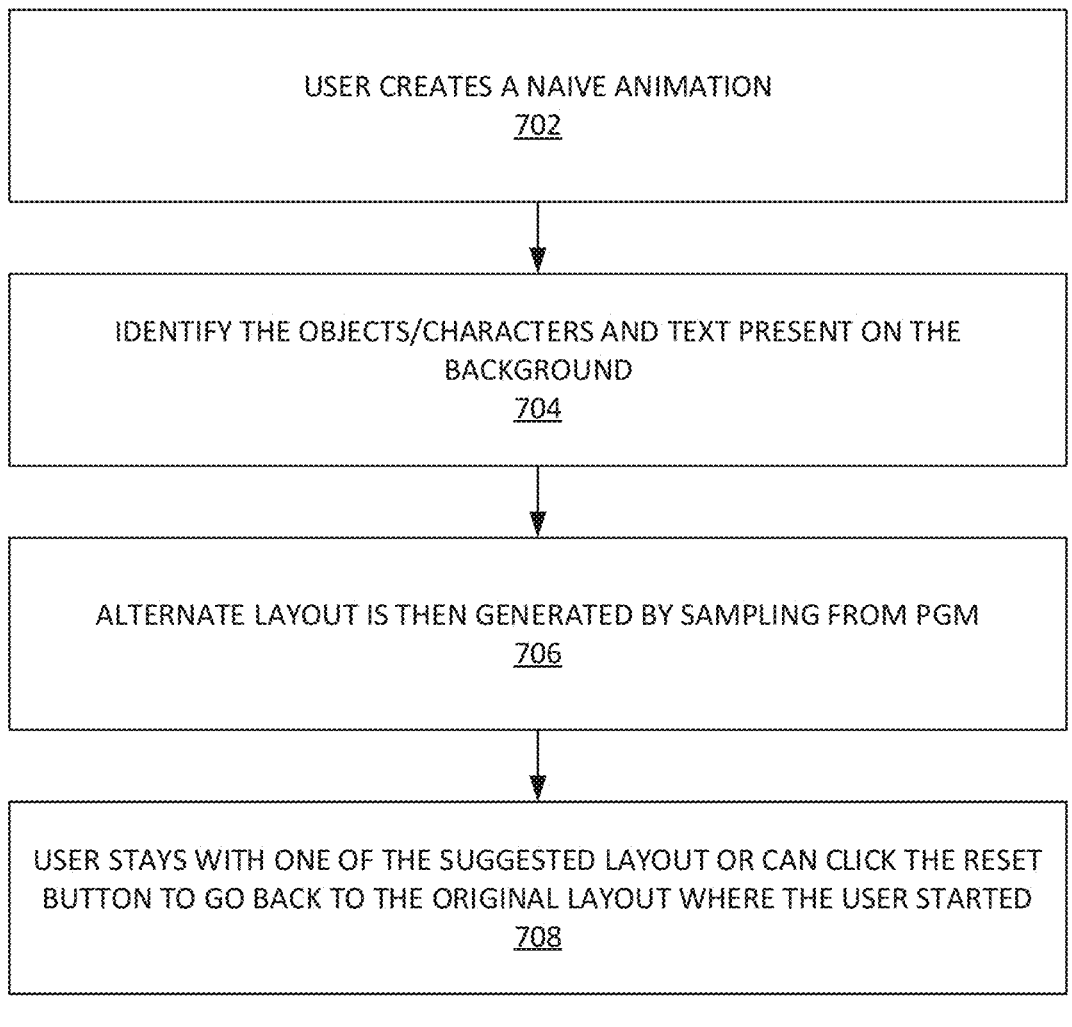

FIG. 7 illustrates a layout suggestion process according to some embodiments.

Figure 8:
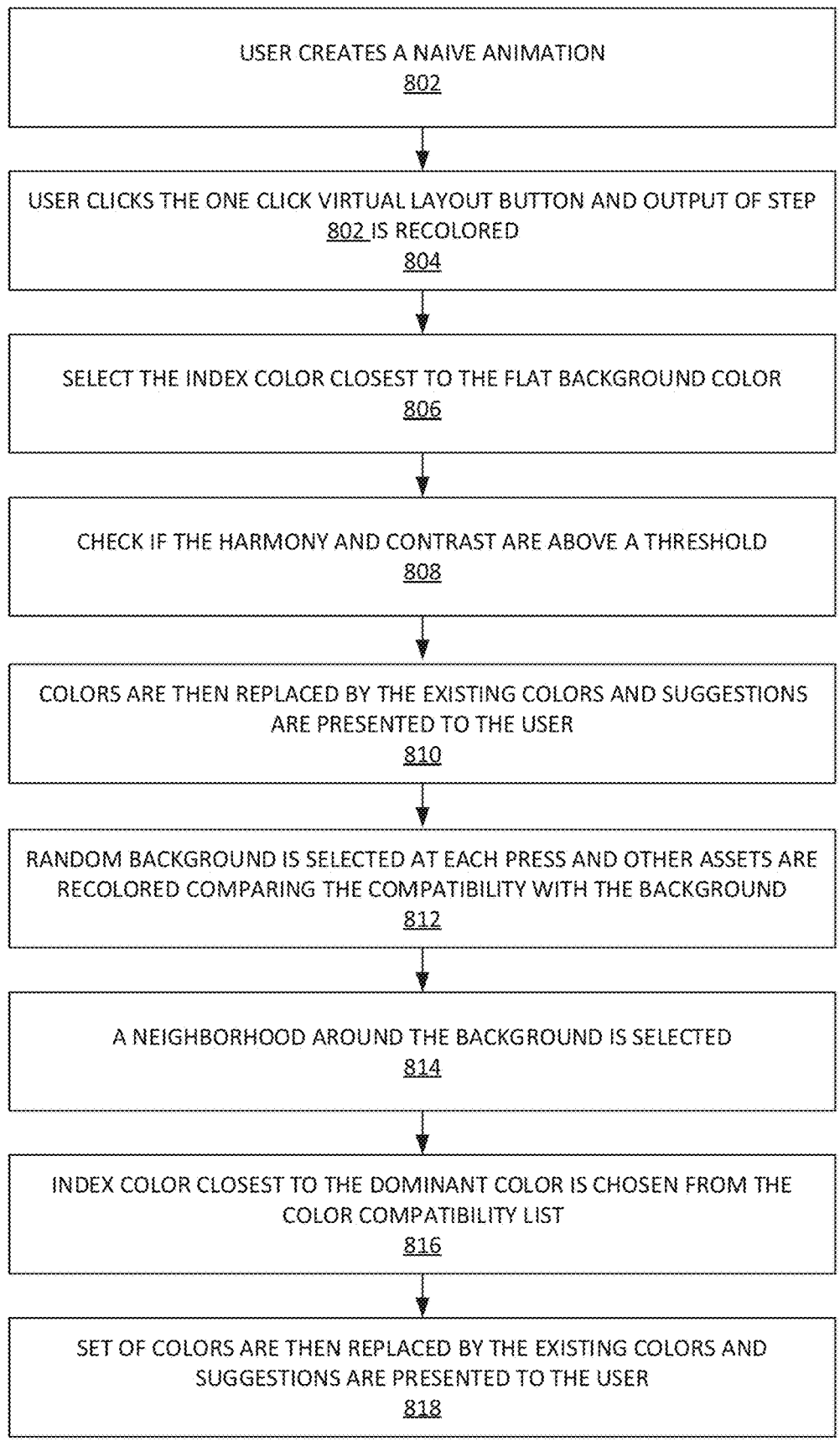

FIG. 8 illustrates an example process for one click virtual button to create different color schemes for the user created layout, according to some embodiments.

Figure 9:
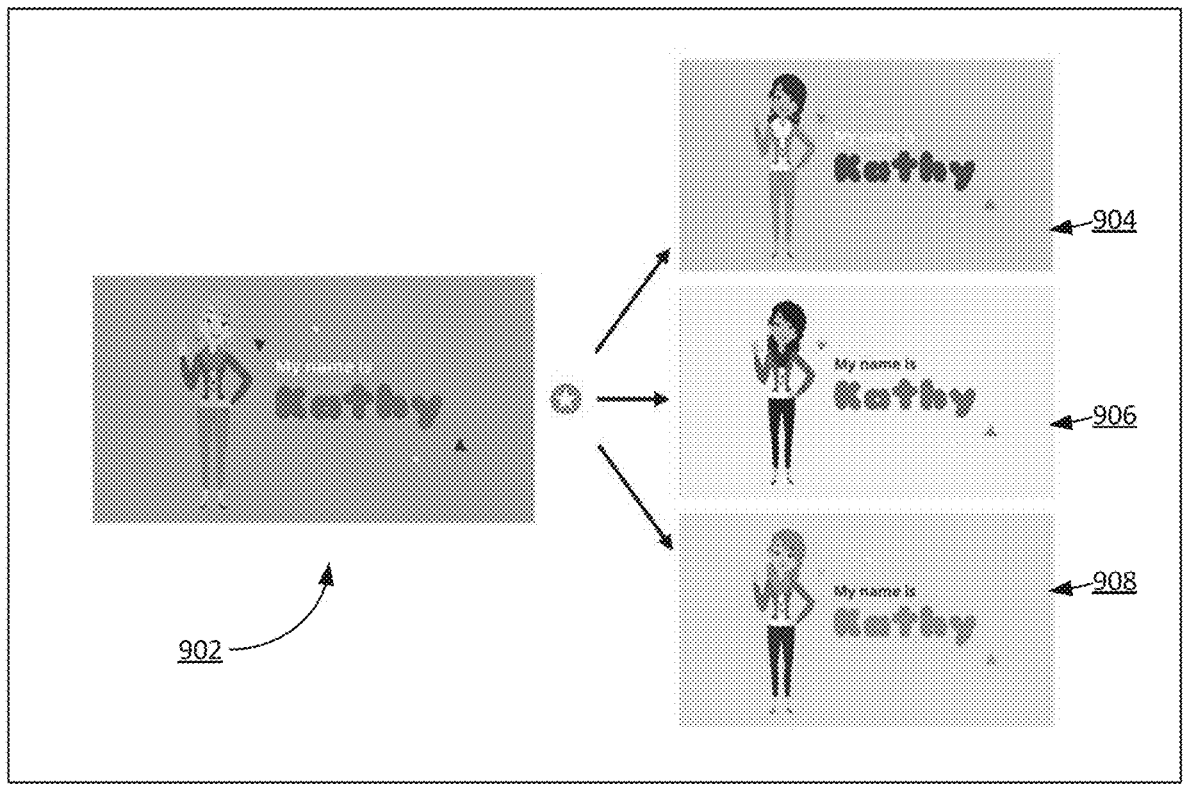

An example use of a single click of the one click virtual color button, multiple alternate color schemes are suggested to the user is provided in FIG. 9, according to some embodiments.

Figure 10:
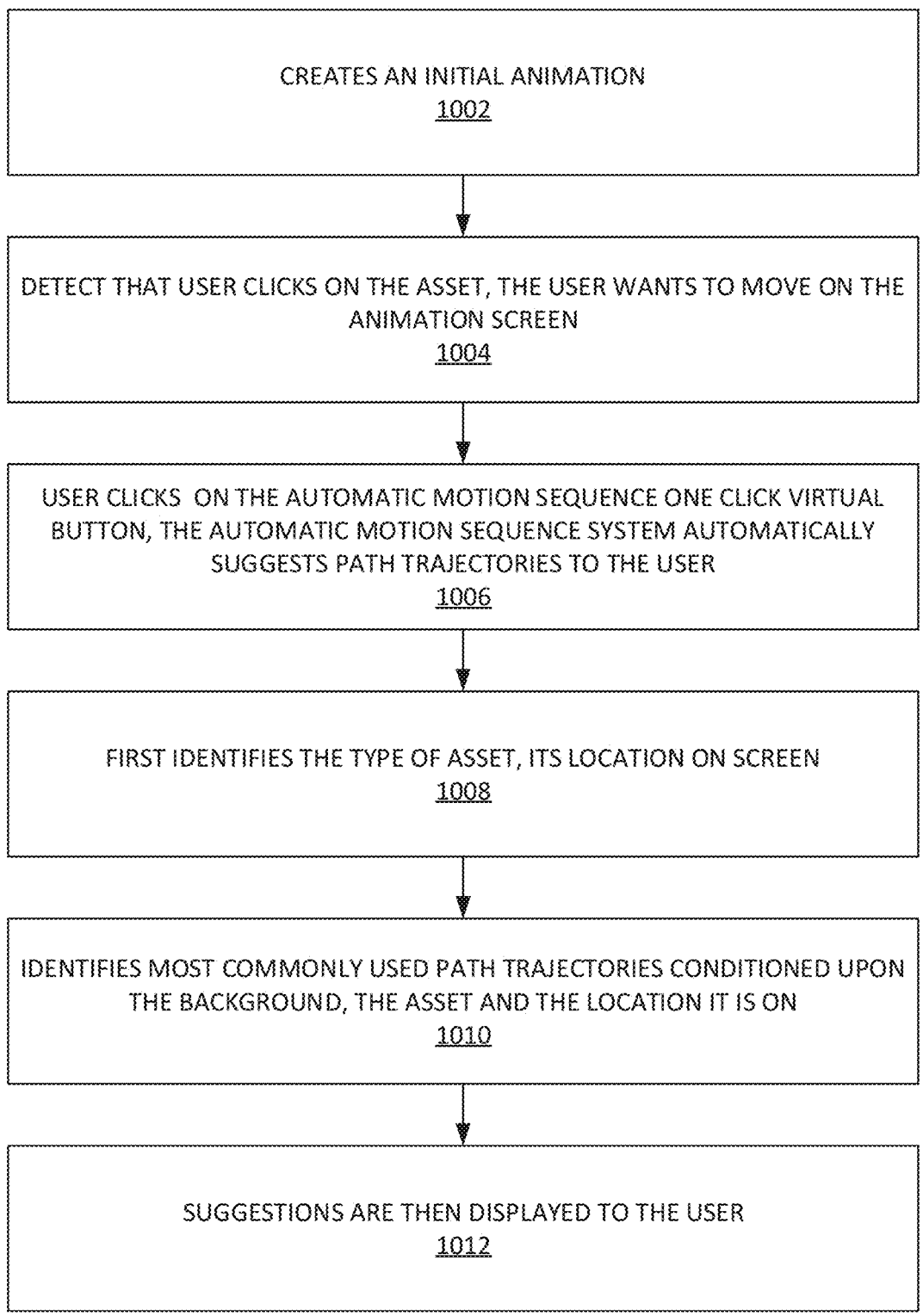

FIG. 10 illustrates an example process for automated motion sequence suggestions, according to some embodiments.

Figure 11:
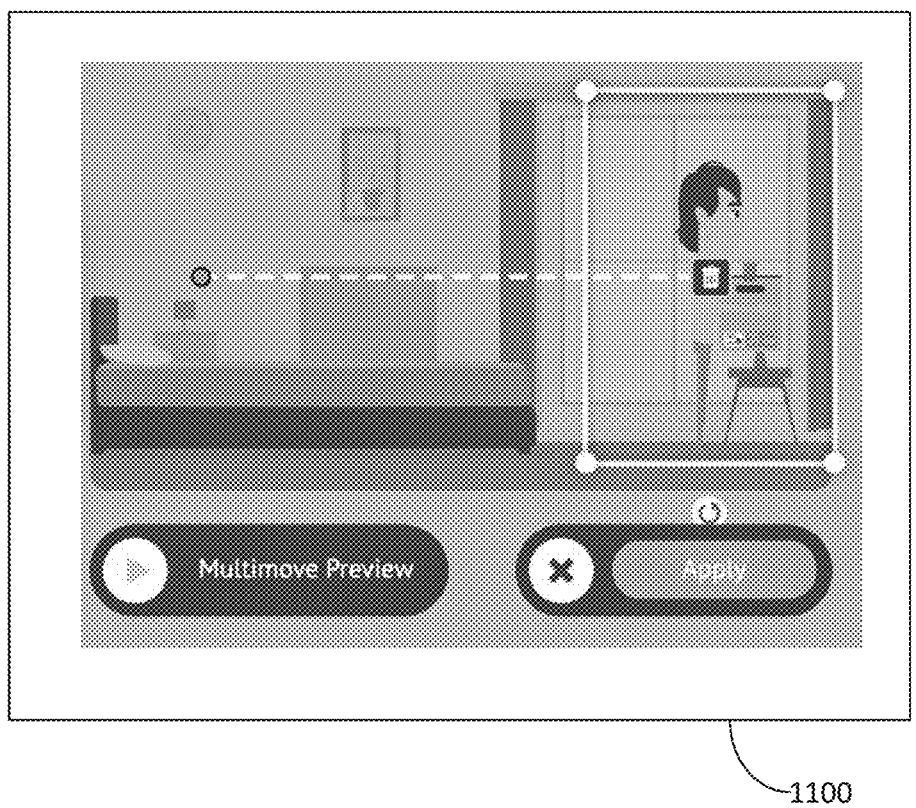

An example use of the automatic motion sequence system is illustrated in FIG. 11, according to some embodiments.

Figure 12:
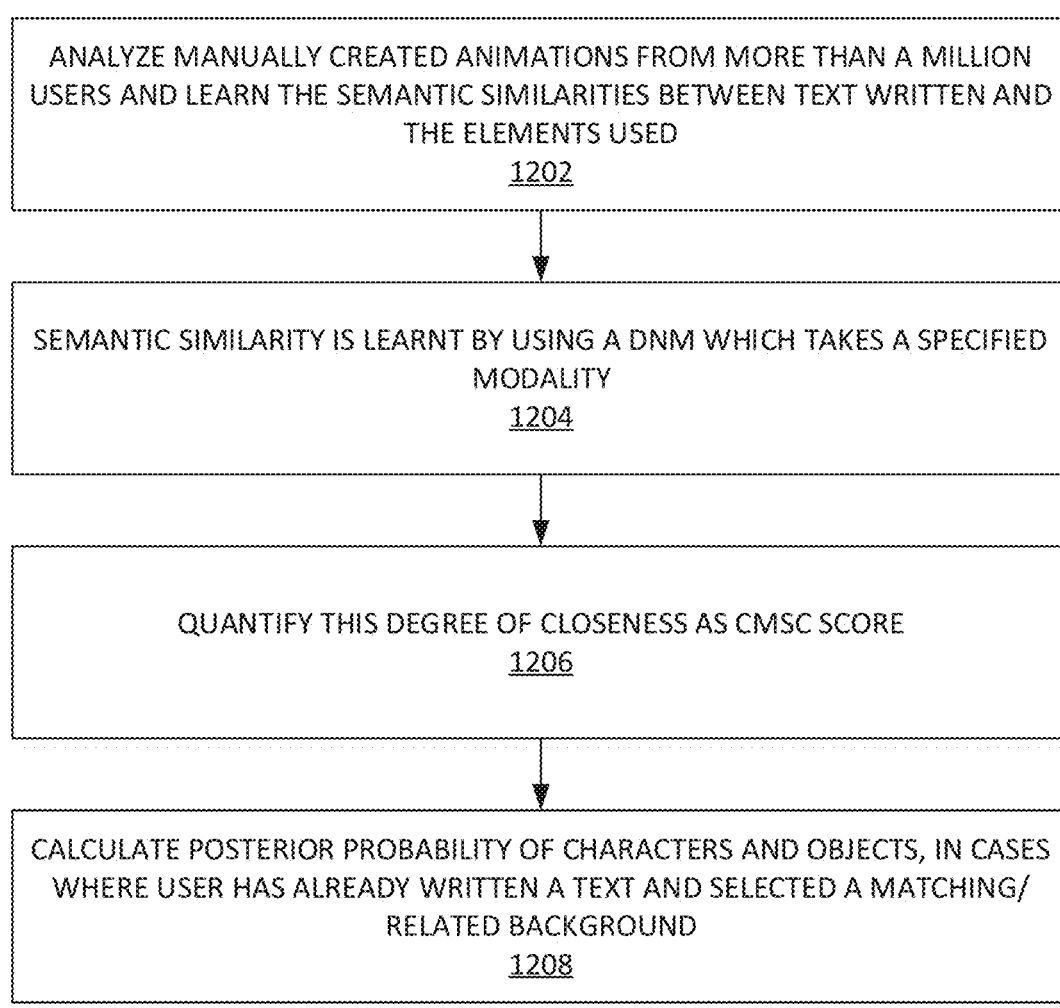

FIG. 12 illustrates an example process for suggesting alternate element suggestion (e.g. backgrounds, characters, objects, music, background sound, etc.) one click virtual button, according to some embodiments.

Figure 13:
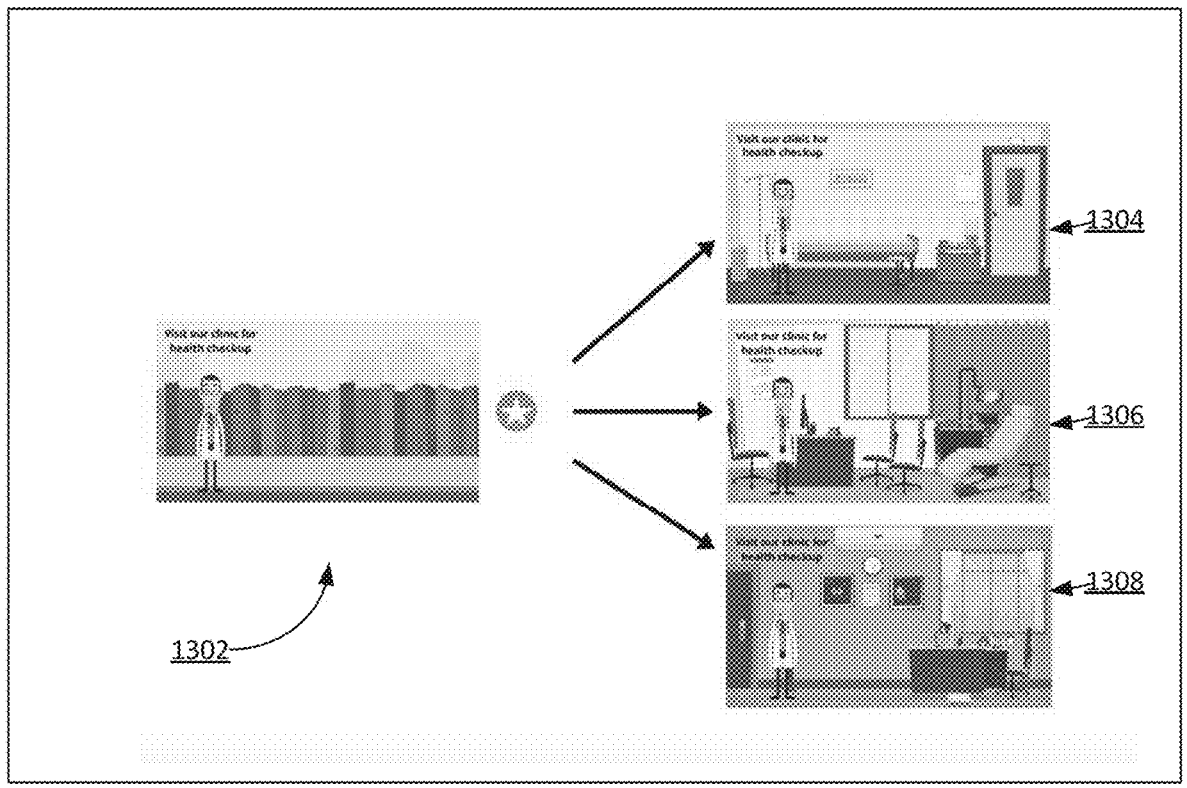

An example alternate element one click virtual button is given in FIG. 13, according to some embodiments.

Figure 14:
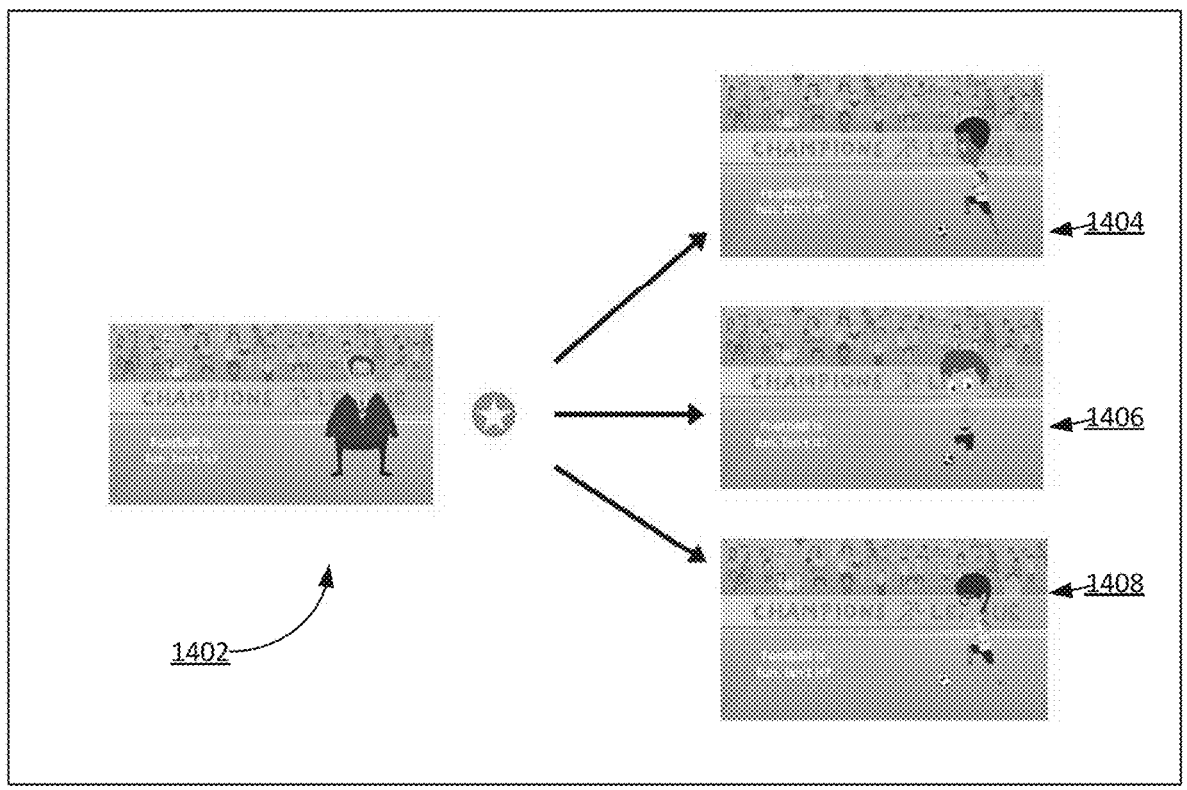

FIG. 14 illustrates an example of characters and objects, in cases where user has already written a text and selected a matching/related background, according to some embodiments.

Figure 15:
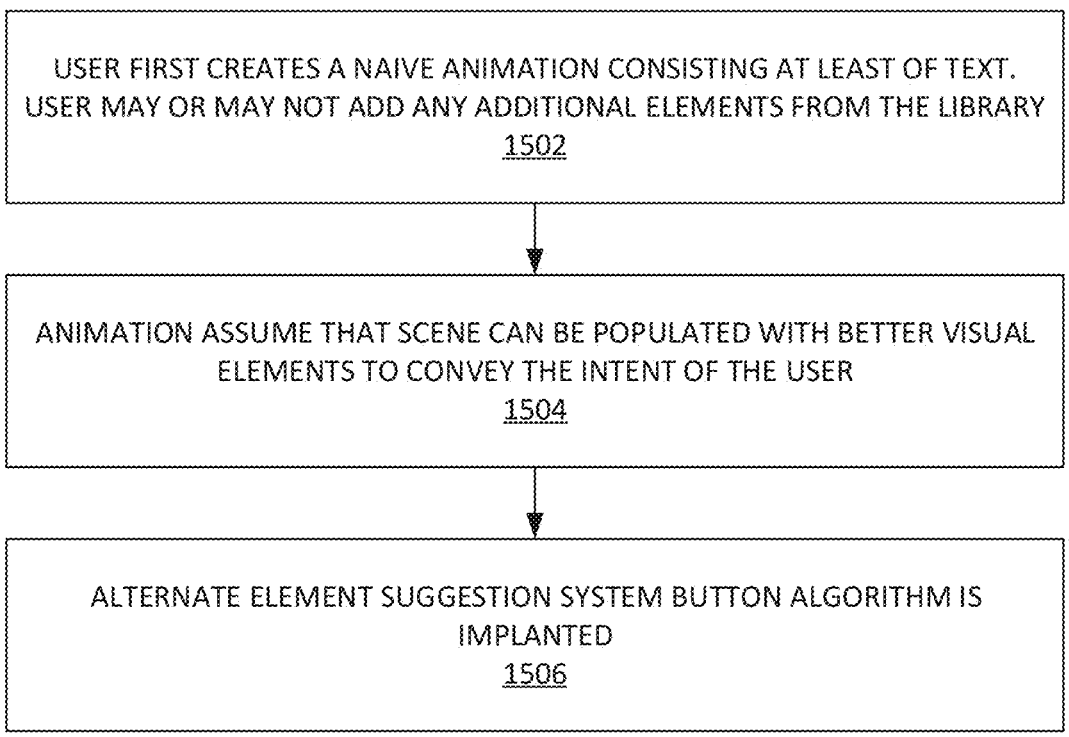

FIG. 15 illustrates an example process for alternate element suggestion, according to some embodiments.

Figure 16:
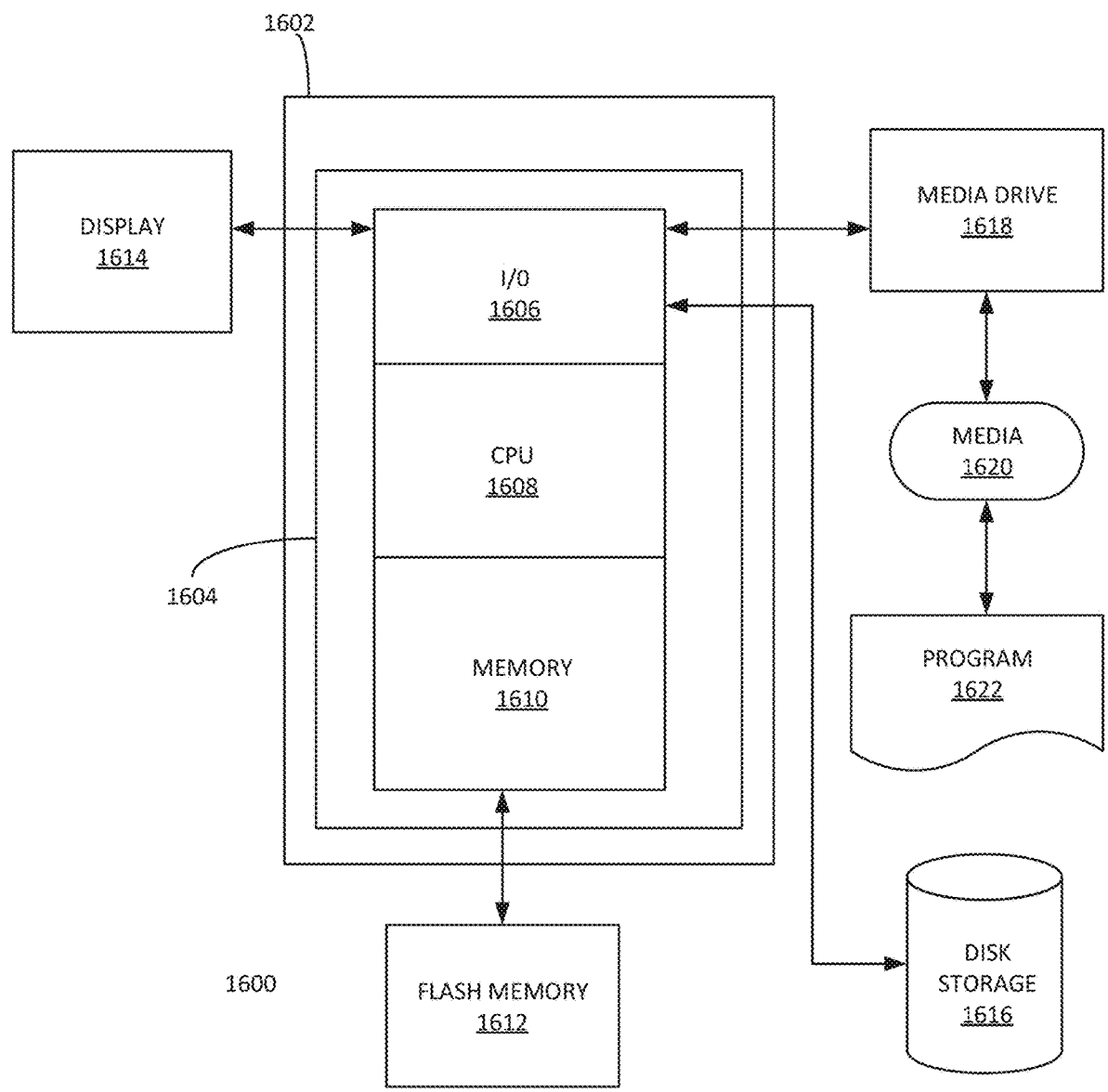

FIG. 16 depicts an exemplary computing system that can be configured to perform any one of the processes provided herein.

The Figures described above are a representative set and are not an exhaustive with respect to embodying the invention.

DESCRIPTION

Disclosed are a system, method, and article of manufacture for automatic one click virtual button with ai assist for do it yourself (DIY) animation. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Cosine similarity is a measure of similarity between two non-zero vectors of an inner product space that measures the cosine of the angle between them.

Extensible Markup Language (XML) is a markup language that defines a set of rules for encoding documents in a format that is both human-readable and machine-readable.

JavaScript Object Notation (JSON) is an open-standard file format that uses human-readable text to transmit data objects consisting of attribute-value pairs and array data types (or any other serializable value).

k-means clustering is a method of vector quantization used for cluster analysis. k-means clustering can be used to partition n observations into k clusters in which each observation belongs to the cluster with the nearest mean, serving as a prototype of the cluster.

Unsupervised learning is a type of machine learning algorithm that can be used when the groups/categories of data are not known to determine patterns in the data. Unsupervised learning is a term used for modelling the probability density of inputs.

Example Methods

Figure 1:
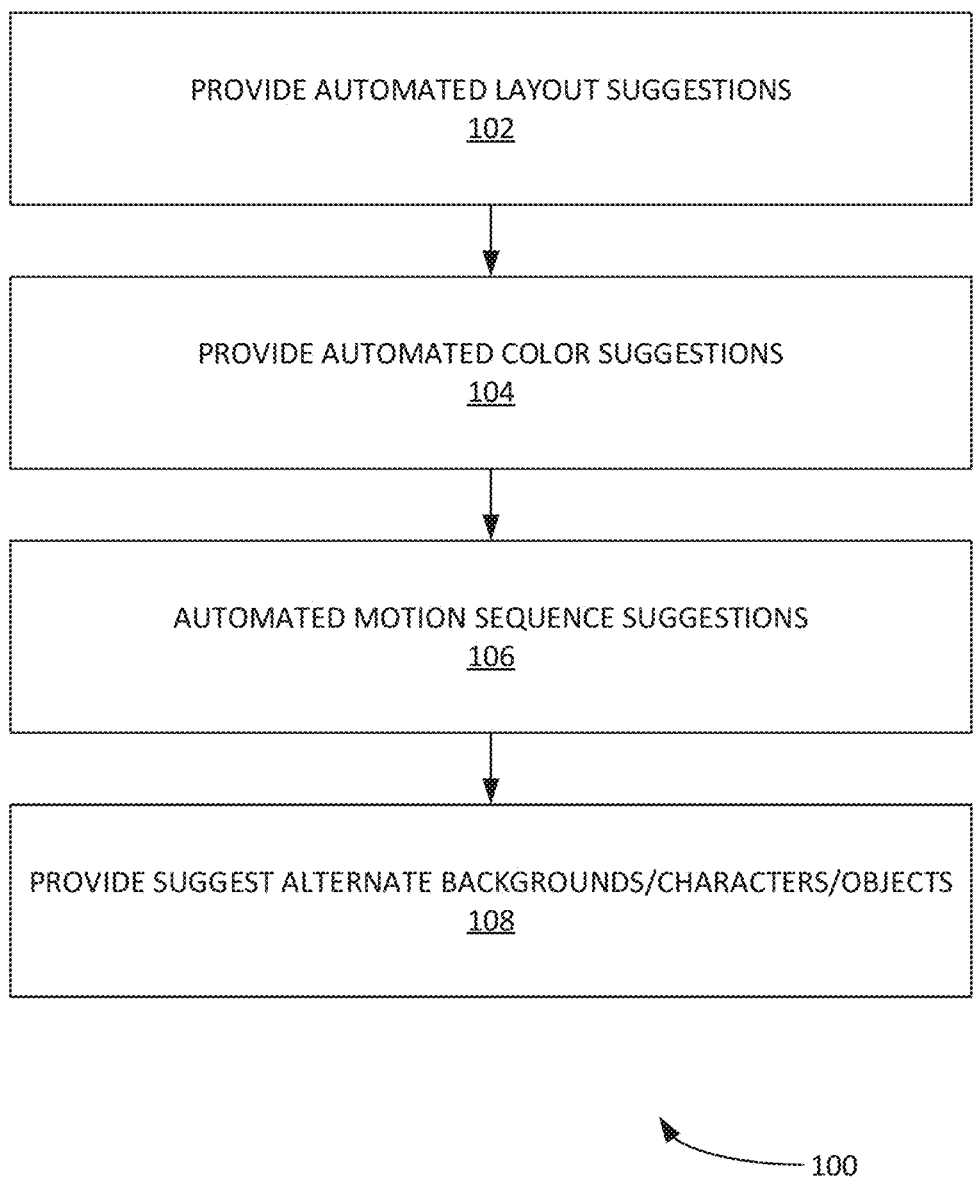
FIG. 1 illustrates an example process for automatically generating video content using a one click AI assistant for generating an animation video, according to some embodiments.

FIG. 1 illustrates an example process for automatically generating video content using a one click AI assistant for generating an animation video, according to some embodiments. Process 100 can provide a one click AI assistant for generating an animation video. The one click AI assistant can suggest possible choices to the user on a single button press for different aspects in the process of creating the animation.

The one click AI assistant can be employed with any DIY animation system. The one click AI assistant can interactively provide alternate suggestions for color, layout, motion etc. on a single click by the user. The one click AI assistant can include a machine learning (ML) based system. The ML based system can learn various choices from an existing animation corpora previously created by humans.

More specifically, in step 102, process 100 can provide automated layout suggestions. In step 104, process 100 can provide automated color suggestions. In step 106, process 100 can provide automated motion sequence suggestions. In step 108, process 100 can provide suggest alternate backgrounds/characters/objects. Example implementations of these steps is provided in greater detail infra.

Figure 2:
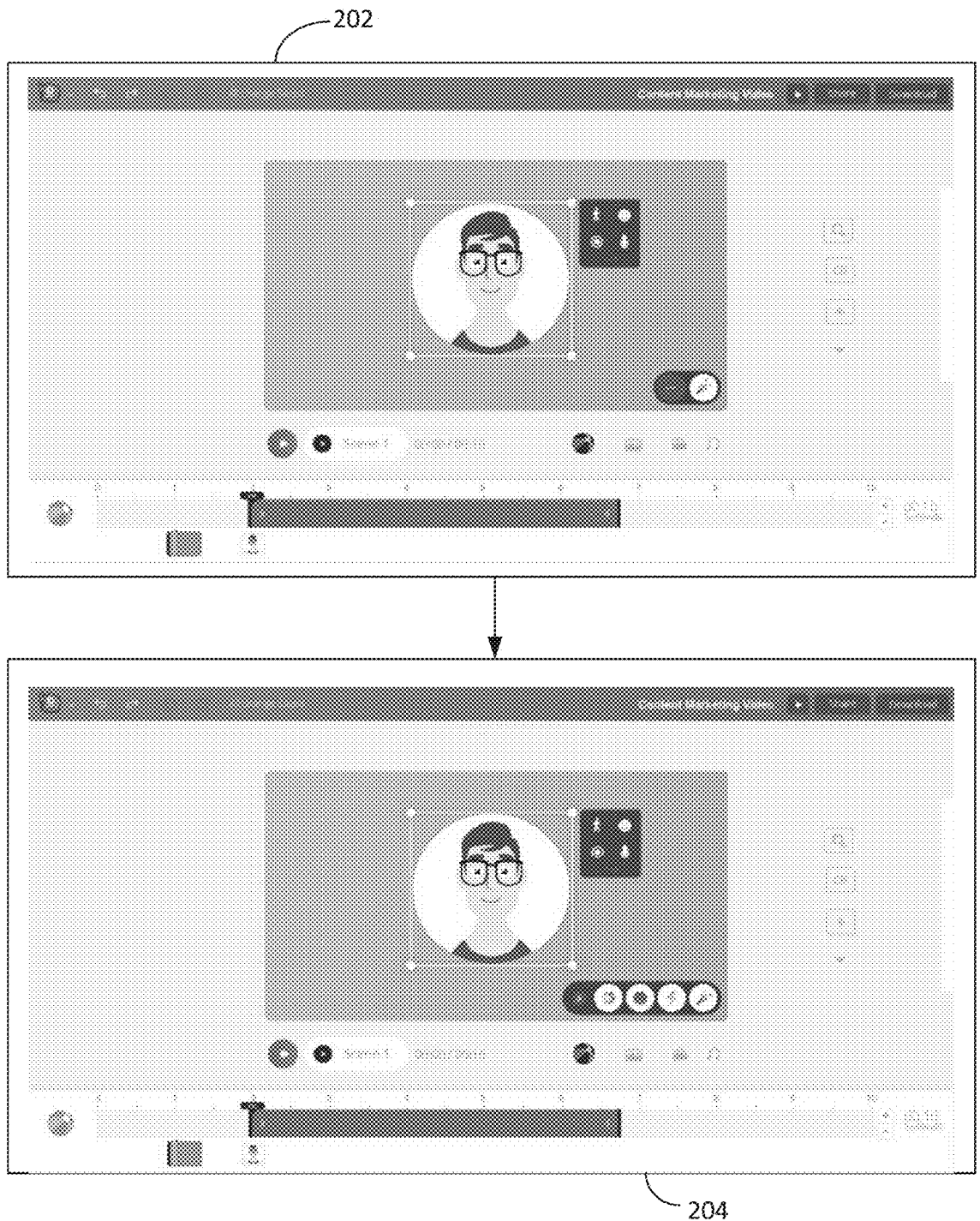
FIG. 2 illustrates an example screen shot of illustrating use of a one click virtual button with AI assist for DIY animation, according to some embodiments.

FIG. 2 illustrates an example screen shot of illustrating use of a one click virtual button with AI assist for DIY animation, according to some embodiments. As shown in screen shots 202 and 204, the one click virtual button works as a single button. On clicking on it, the one click virtual button shows multiple one click virtual button with AI assist for DIY animations for different functionalities. Example functionalities can include, inter alia: layout one click virtual button with AI assist for DIY animation, color one click virtual button with AI assist for DIY animation, motion sequence one click virtual button with AI assist for DIY animation etc. Screen shots 202 and 204 show that, as the user clicks on the one click virtual button with AI assist for DIY animation, all the options appear.

Figure 3:
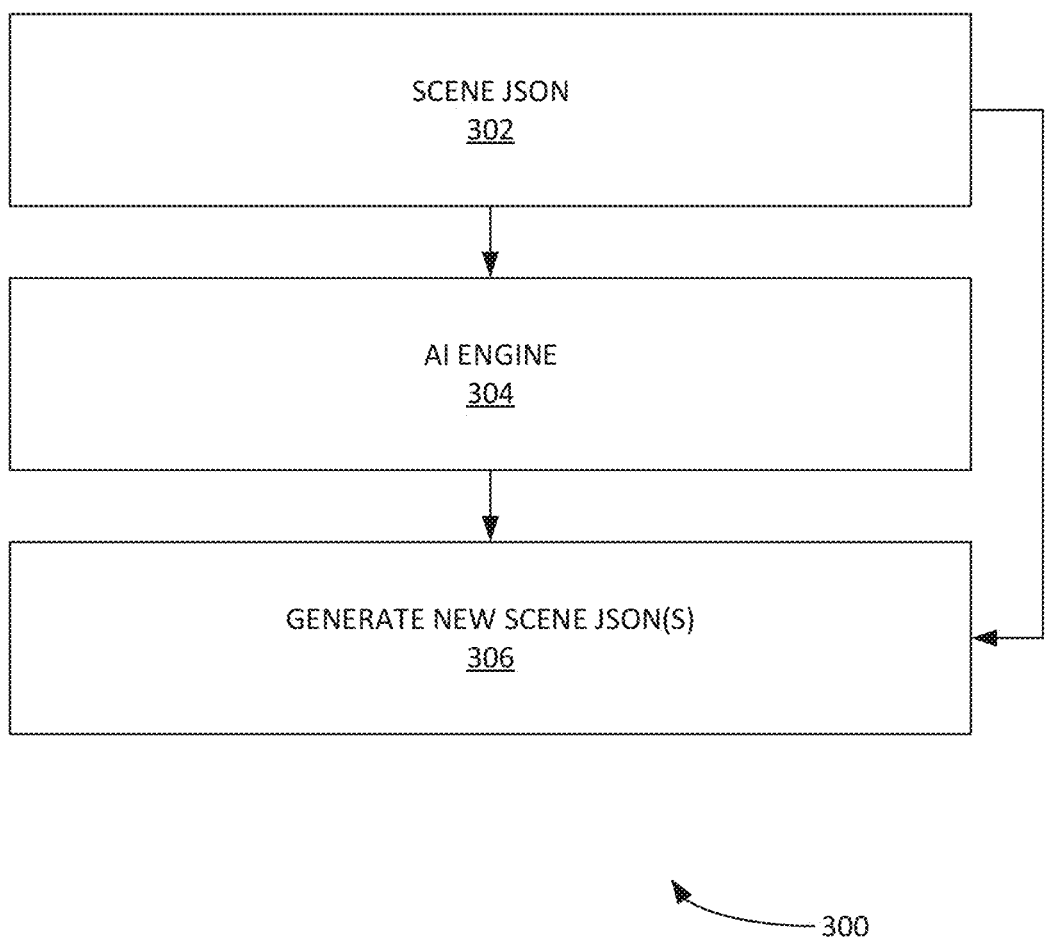
FIG. 3 illustrates an example process for implementing a one click AI assistant or generating an animation video, according to some embodiments.

FIG. 3 illustrates an example process 300 for implementing a one click AI assistant for generating an animation video, according to some embodiments. In step 302, process 300 can implement a particular scene JSON. This can be done in a DIY animation application. In step 304, process 300 can AI/ML-based operations with an AI engine. In step 306, process 300 can, based on user-selection feedback, provide additional scene JSONs.

It is noted that a plurality of one click virtual button with AI assist for DIY animation can be utilized based on the types of animation modifications/updates desired. Various example types are now discussed.

Figure 4:
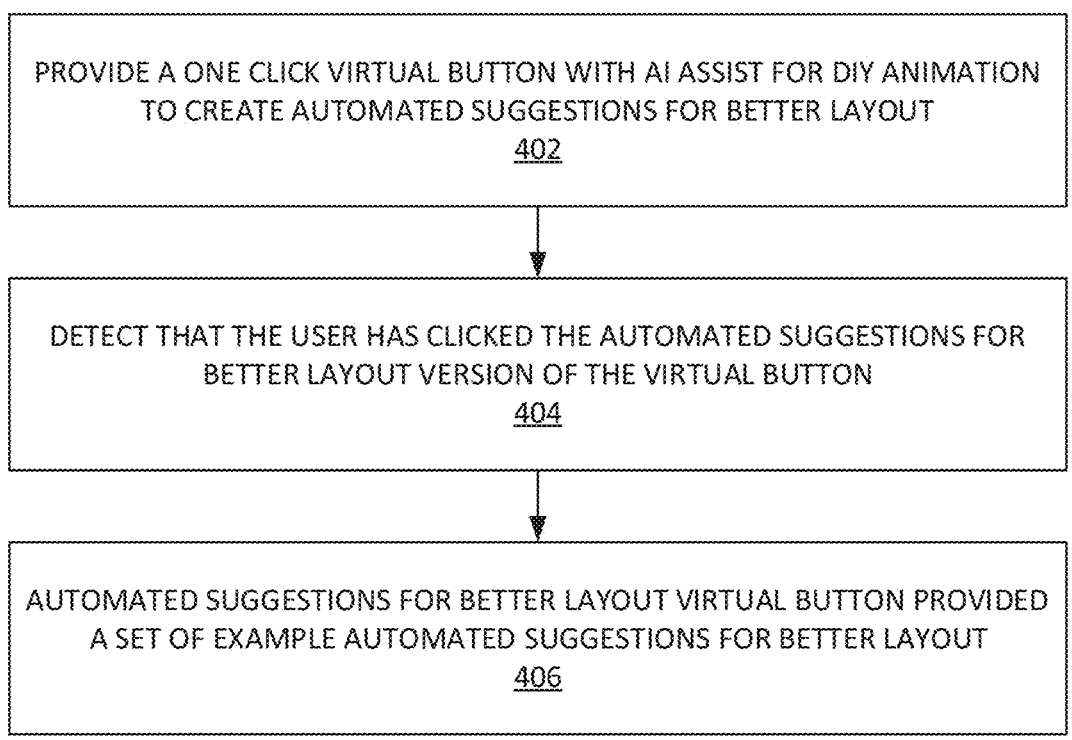
FIG. 4 illustrates a process for implementing an automated layout suggestions with one click virtual button with AI assist for DIY animation, according to some embodiments.

FIG. 4 illustrates a process 400 for implementing an automated layout suggestions with one click virtual button with AI assist for DIY animation, according to some embodiments.

In a DIY animation application, in step 402, process 400 provides a one click virtual button with AI assist for DIY animation to create automated suggestions for better layout. In step 404, process 400 detects that the user has clicked the automated suggestions for better layout version of the virtual button. In step 406, the automated suggestions for better layout virtual button provided a set of example automated suggestions for better layout.

An example of a one click virtual button with AI assist for DIY animation is provided in FIG. 5, according to some embodiments. In this example, a where the user imports a character and background from the library and writes some text on the animation slide. The user then clicks on the virtual layout button in scene 502 and process 400 suggests several alternate layout possibilities 504-508 to the user. In some embodiments, a layout suggestion system (e.g. layout suggestion system infra) and/or process 400 is learnt from machine learning tools applied on the large corpus of user data.

FIG. 6 illustrates a layout suggestion process 600 according to some embodiments. Process 600 can be implemented by a layout suggestion system. Process 600 can use Probabilistic Grid Maps (PGM). In step 602, process 600 can analyze a manually created animation(s) from a large set of historical users (e.g. more than a million users, et.) and learn the relevant PGMs. The PGMs are uniform set of discretized positions on the screen and each position stores the probability that a character can be centered at the particular positions.

In step 604, the PGMs are conditioned on the background. For example, a separate grid maps are learnt for each of the backgrounds in library. In step 606, conditional maps store the likely positions where the character can be placed in a particular background. As this is learnt from user created animations, the positions where characters are rarely placed are provided with a low probability and positions where the users commonly place characters are provided a high probability. Moreover, in step 608, a common grid map is also learnt using the entire corpus without any conditioning on the background. The common grid map is employed for cases with flat background or user customized background (e.g. not from library) and/or a background with sparse usage in the user corpus.

Similarly, in step 610, the relative probabilistic grid maps are also learnt from historical user data. In one example, four different relative grid maps can be learnt in the proposed framework. These can include relative grid maps between character and text, character and character, object and text, object to object. For example, the character and text relative grid map encodes the probability of positioning a text at a particular position given a character has already been placed.

In step 612, the single item grid maps and relative grid maps are then together employed for generating aesthetically pleasing layouts. An example of this process is illustrated below in process 700.

FIG. 7 illustrates a layout suggestion process 700 according to some embodiments. Process 600 can be implemented by a layout suggestion system. In step 702, the user creates a naive animation as illustrated in FIG. 5. Process 700 can assume that the positions are not the most optimized and a better layout exists. The user can click the one click virtual layout button and process 700 can generate suggestions of alternate layout designs. In the backend, the layout suggestion system implements the remaining steps of process 700.

In step 704, process 700 identifies the objects/characters and text present on the background. Process 700 also identifies if the background is from the library or it is a flat color background.

In step 706, the alternate layout is then generated by sampling from PGM. One of the characters is first placed by sampling from the PGM's. If there is no character, then object is placed first. Then the text is sampled using relative PGM. Sampling each time leads to a different layout and the current layout is updated according to the generated suggestion. Each time the user clicks on the one click layout button; a new layout is generated.

In step 708, the user can stay with one of the suggested layout or can click the reset button to go back to the original layout where the user started.

FIG. 8 illustrates an example process 800 for one click virtual button to create different color schemes for the user created layout, according to some embodiments. Process 800 can provide automated color suggestions. Process 800 can be implemented by an automated color system (e.g. automated color system infra).

An example use of a single click of the one click virtual color button, multiple alternate color schemes are suggested to the user is provided in FIG. 9, according to some embodiments. In FIG. 9, the user imports a character and background from the library and write some text on animation slide 902. Then, the user clicks on the one click color button and the system suggests several alternate color schemes 904-908 to the user. The suggested color scheme is learnt from machine learning tools applied on the large corpus of user data.

Returning to FIG. 8, process 800 can employ the ideas of harmony and luminance contrast in the recoloring process. Luminance contrast is a basic color image property, which measures the lightness difference between two color. Pair of colors with higher contrast are easier to differentiate. Some common examples are black text on white background in books, or black text on yellow number plates etc. Good contrast enhances the legibility of the image content. A minimum contrast may be necessary for proper readability. Color Harmony, on the other hand is usually modelled based on physiological experiments. One of the well-known rules states that colors having similar hues or complementary hues are harmonious. The color harmony models can be derived from perceptual/psychological experiments and represented in the form of mathematical formula to quantify color harmony. A simple regression function can be learnt between the user ratings on harmony and the pair of colors shown to them, to compute the harmony function.

Process 800 can use a large amount of user data to learn color sets. For example, process 800 can learn which set of colors which look coherent and pleasing when used together. A large color compatibility list of list is formed. Each row in the list represents a background color as an index and a list of colors which go along well with the particular background color. The properties of colors are also stored with it. Color properties can include, inter alia: background, text box color, text color, object color etc.

More specifically, the auto color functionality of process 800 can implement the following steps. In step 802, the user first creates an initial animation (e.g. as illustrated in FIG. 9). The color schemes may not be as coherent and aesthetically pleasing in the naïve initial animation. In step 804, the user can click the one click virtual layout button and process 800 recolors the output of step 802 to a different theme. Each press generates an alternate theme and user can keep clicking until he is satisfied. At any point, the user can click the reset button to return to the original color theme he started with. In step 806, using the automated color system, process 800 can, if the animation is of flat background, select the index color closest to the flat background color. Then required number of colors are randomly sampled from the list corresponding to the chosen index color. In step 808, for each sampled color, process 800 checks if the harmony and contrast are above a threshold. If yes, these set of colors are then replaced by the existing colors and suggestions are presented to the user in step 810. The sampling and replacement are conditioned on the kind of property (character color palette, text box color, text color, object color etc.).

It is noted that all animated assets (e.g. backgrounds, characters etc.) come with a set of predefined color profiles. These assets can be re-colored by choosing the most compatible color set for the given setting. In step 812, a random background is selected at each press and other assets are recolored comparing the compatibility with the background. The compatibility is computed using contrast and harmony cost.

If the animation is from the list pre-drawn background in the library, then a neighborhood around the background is selected in step 814. The dominant color from the neighborhood is then computed. The index color closest to the dominant color is chosen from the color compatibility list in step 816. The required set of colors can be randomly sampled from the list corresponding to the chosen index color. These set of colors are then replaced by the existing colors and suggestions are presented to the user in step 818. The replacement and sampling are conditioned on the kind of property (e.g. character color palette, text box color, text color, object color etc.).

FIG. 10 illustrates an example process 1000 for automated motion sequence suggestions, according to some embodiments. It is noted that automated motion sequence suggestions can include auto suggest path animation. Process 1000 can provide and manage the motion sequence of multiple objects and characters. For example, a human may be shown to walk from one point to another. In another example, a balloon may be shown flying upwards in a wavy trajectory. Given a background setting and relative positions of several assets shown on screen, process 1000 can determine the motion sequences for different assets. The motion sequence is made to appear natural, as well. Process 1000 can provide the motion sequence in a coherent manner with respect to other objects present in the scene. Moreover, the overall motions sequence can be set to be aesthetically pleasing.

Process 1000 can provide path animation and motion in computer-based animation for objects. As used herein, objects can mean, inter alia: an animated person, an animal, a vehicle, a robot, an object, etc. Object can also mean, inter alia: Illustrated props, photo-images, shapes (e.g. square, rectangle, etc.), etc. Process 1000 can understand the context of the animation scene and then create path animation on a step by step basis.

Process 1000 can provide an automatic motion sequence one click virtual button. The automatic motion sequence one click virtual button can access the functionality of an automatic motion sequence system (e.g. automatic motion sequence infra). The automatic motion sequence system can suggest possible motions sequence for each of the assets present in the scene. For example, a character at the left can be auto suggested to move to the left to right, leaf at the top will be auto suggested to follow a curved path towards the bottom of the screen. Similarly, a balloon can be suggested to fly from bottom to top, in a wavy path.

An example use of the automatic motion sequence system is illustrated in FIG. 11, according to some embodiments. In FIG. 11, the user places a right facing character on the left part of the screen. Once clicked on automatic motion sequence one click virtual button, the automatic motion sequence system suggests the most feasible path in the present setting of the animation scene/context. The speed of movement is also automatically determined by the automatic motion sequence system using a specified machine learning algorithm. If other motions are feasible, the automatic motion sequence system can suggest multiple options.

A motion sequence prediction is conditioned both on the asset (e.g. if it is a character, balloon, car etc.), the background and its current position on screen. The automatic motion sequence system understands the type of object and the current position of the object in the screen. Based on this data, the automatic motion sequence system then suggests a possible path animation. This path animation enables an object to move from one point to another point logically. The path animation enables the object can move to multiple places in the screen which contributes to the overall animation of the screen. Motion sequence prediction can be conditioned on voice over sound, if available. For instance, saying "I am going home" If the user takes four (4) seconds to say the phrase would make the character move slowly. On the hand saying the same sentence in two (2) seconds would make the character move faster.

Moreover, a voice-based interaction with the magic-button system using the one click virtual button (e.g. a 'magic' button, etc.) can be provided. The voice-based interface allows the users to operate magic button through verbal commands. For instance, saying "magic, suggest alternate layouts" can be equivalent to clicking the magic layout button. Similarly, saying "magic, suggest alternate color" can change color schemes, saying "magic, suggest alternate backgrounds" would show different background choices. The magic button can be used for changing emotion of the character. In one example, the emotion of the text is detected by classification using a deep neural network architecture. The deep neural network network gives probabilistic weights for each of the six classes of emotions: happiness, sadness, fear, surprise, anger and disgust. The deep neural network is trained using a large manually annotated data with text and corresponding emotions. The probabilities are computed using the last SoftMax layer of the deep neural network. The emotion magic button on click, proposes alternate emotions to the user. Each click presents a new emotions, user can click the rest button to go back to the original emotion.

The suggestions can be curated using unsupervised machine learning algorithm. This can include a set of analyses of millions of user created path animations. Process 1000 then learns possible motion trajectories conditioned upon the object type and the position on the screen. In one example, the machine learning steps are performed using a clustering algorithm. The clustering algorithm can cluster similar path trajectories and retain the top five cluster centers conditioned on each background and/or type of asset and the position. Various standard predefined manual paths can also be employed by process 1000.

More specifically, in step 1002, the user creates an initial animation (e.g. as illustrated in FIG. 11). In step 1004, the user clicks (and/or otherwise identifies for selection) on the asset, the user wants to move on the animation screen. In step 1006, the user clicks on the automatic motion sequence one click virtual button, the automatic motion sequence system automatically suggests path trajectories to the user.

One the backend, in step 1008, the automatic motion system identifies the type of asset, its location on screen. From the large database, in step 1010, process 1000 identifies most commonly used path trajectories conditioned upon the background, the asset/object and the location it is on.

In step 1012, the suggestions are then displayed to the user. The suggestions can be provided in the form of the dotted trajectories. The user can select the trajectory which appears appropriate. The automatic motion sequence can then automatically decide the movement speed and create the path animation.

FIG. 12 illustrates an example process 1200 for suggesting alternate element suggestion (e.g. backgrounds, characters, objects, music, background sound, etc.) one click virtual button, according to some embodiments. An alternate element suggestion one click virtual button can be used to create automated suggestions for alternative or in some cases, better element suggestions.

An example alternate element one click virtual button is given in FIG. 13, according to some embodiments. The background suggestions (e.g. given only text) generated by the system. As shown in FIG. 13, a user writes some text on an animation slide 1302. Then the user clicks on the alternate element suggestion button to suggest different elements and the alternate element suggestion system suggests different elements 1304-1308 which helps user convey the written text. This alternate element suggestion system is learnt from machine learning tools applied on the large corpus of user data.

The alternate element suggestion system utilizes Cross-Modal Semantic Coherence (CMSC) between the text and different visual elements. In step 1202, process 1200 analyzes the manually created animations from more than a million users and learn the semantic similarities between text written and the elements used. In step 1204, the semantic similarity is learnt by using a Deep Neural Model (DNM) which takes a specified modality (e.g. text written and image of the element). DNM then tries to bring data points of different modalities closer to each other in some semantic space. Instep 1206, process 1200 quantifies this degree of closeness as CMSC score. CMSC score can be realized by one of standard distance metrics (e.g., cosine, Euclidean, etc.). Since process 1200 trains using the user created animations, DNM learns CMSC scores between intent of the text and the elements used with it. For example, text: "I am ill today" will get a high CMSC score with respect to a hospital background. In this way, given a text and a library of visual elements, process 1200 can first map the text and all the elements to a semantic space using a DNM. Process 1200 can then find the elements having highest CMSC score with the text as suggestions to the user. Moreover, process 1200 has a separate DNM for different types of elements vis-a-vis backgrounds, characters and objects.

In step 1208, process 1200 calculates the posterior probability of characters and objects, in cases where user has already written a text and selected a matching/related background.

FIG. 14 illustrates an example of characters and objects, in cases where user has already written a text and selected a matching/related background, according to some embodiments. FIG. 14 illustrates example character suggestions (e.g. given text and the background) 1404-1408 generated by the alternate element suggestion system from animation scene 1402.

Returning to FIG. 12, process 1200 can use to provide more refined results. In this case, instead of finding the characters and objects based on highest CMSC score. Process 1200 finds characters and objects with highest posterior probability. Process 1200 calculates the posterior probability for each character and object as follows: pre-calculate different co-occurrence matrix for backgrounds and characters and backgrounds and objects as prior probability; CMSC score serves as likelihood from the corresponding DNM; and calculate posterior probability=prior probability× likelihood.

It is noted that the alternate element suggestion system can maintain a set of abstract elements which convey neutral emotion to be utilized with any type/kind of text. The alternate element suggestion system can use this set as a fallback option in case no element in the library crosses the minimum threshold.

FIG. 15 illustrates an example process 1500 for alternate element suggestion, according to some embodiments. Process 1500 can use one DNM model (e.g. trained for CMSC) per element type is used in combination to generate aesthetically pleasing scenes. In step 1502, the user first creates a naive animation consisting at least of text. User may or may not add any additional elements from the library. In step 1504, the animation assume that scene can be populated with better visual elements to convey the intent of the user. In step 1506, the user can click the alternate element suggestion button and the alternate element suggestion system can generate suggestions of the elements. In step 1506, the alternate element suggestion system button algorithm is implanted. In one example, step 1506 can implement the following steps: alternate element suggestion system identifies the text present and maps it to the semantic space using DNM; the alternate element suggestion system finds the CMSC score of the text with all the elements in the library; and elements having high score are shown to user as suggestions.

Additional Systems and Architecture

FIG. 16 depicts an exemplary computing system 1600 that can be configured to perform any one of the processes provided herein. In this context, computing system 1600 may include, for example, a processor, memory, storage, and I/O devices (e.g., monitor, keyboard, disk drive, Internet connection, etc.). However, computing system 1600 may include circuitry or other specialized hardware for carrying out some or all aspects of the processes. In some operational settings, computing system 1600 may be configured as a system that includes one or more units, each of which is configured to carry out some aspects of the processes either in software, hardware, or some combination thereof.

FIG. 16 depicts computing system 1600 with a number of components that may be used to perform any of the processes described herein. The main system 1602 includes a motherboard 1604 having an I/O section 1606, one or more central processing units (CPU) 1608, and a memory section 1610, which may have a flash memory card 1612 related to it. The I/O section 1606 can be connected to a display 1614, a keyboard and/or other user input (not shown), a disk storage unit 1616, and a media drive unit 1618. The media drive unit 1618 can read/write a computer-readable medium 1620, which can contain programs 1622 and/or data. Computing system 1600 can include a web browser. Moreover, it is noted that computing system 1600 can be configured to include additional systems in order to fulfill various functionalities. Computing system 1600 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method of automatically generating video content using a one click artificial-intelligence assistant for generating an animation video comprising:

providing a do-it-yourself (DIY) computer animation generation system, wherein the DIY computer animation generation system includes an animation generation dashboard;

providing a one click AI assistant for generating an animation video in the DIY computer animation generation system; and one click virtual button displayed in the animation generation dashboard, wherein the one click AI assistant automatically suggests a set of animation choices to a user on a single button press of the one click virtual button, wherein an initial animation is generated by the user, and wherein the set of animation choices comprises a set of automated layout suggestions;

wherein the set of animation choices comprises a set of automated layout suggestions are generated by:

providing a set of automated suggestions for a better layout, analyzing a set of historically created manually created animations from a large set of historical users and learning each Probabilistic Grid Maps (PGM) of each historically created manually created animation, wherein each PGM comprises uniform set of discretized positions on a screen and each position stores the probability that a character can be centered at the particular positions; and using the learning of each PGM to generate a set of example automated suggestions for the better layout, wherein each PGM is conditioned on each background of each historically created manually created animation.

2. The computerized method of claim 1, wherein the set of animation choices comprises a set of automated layout suggestions are generated by:

providing a one click virtual button with AI assist for DIY animation to create automated suggestions for the better layout; and detecting that the user has clicked the automated suggestions for the better layout version of the virtual button.

3. The computerized method of claim 1, wherein the set of animation choices comprises a set of automated color suggestions.

4. The computerized method of claim 3, wherein the set of animation choices comprises a set of automated color suggestions are generated by:

generating a color compatibility list; and selecting one or more index colors closest to a dominant color from the color compatibility list.

5. The computerized method of claim 4, wherein the set of animation choices comprises a set of automated motion sequence suggestions.

6. The computerized method of claim 5, wherein the set of animation choices comprises a set of automated motion sequence suggestions are generated by:

identifying a type of asset for the automated motion sequence suggestion and a location of the asset on the screen; and from a database of historical automated motion sequences, identifying a most commonly used path trajectories conditioned upon the background, the type of asset and the location of the asset.

7. The computerized method of claim 6, wherein the set of animation choices comprises a set of suggested alternate backgrounds of the animation video.

8. The computerized method of claim 7, wherein the set of animation choices comprises a set of one or more alternate selections of a character of the animation video.

9. The computerized method of claim 8, wherein the set of animation choices comprises a set of one or more alternate selections of an object of the animation video.

* * * * *